US006319604B1

(12) United States Patent
Xu

(10) Patent No.: US 6,319,604 B1
(45) Date of Patent: Nov. 20, 2001

(54) ABRASION RESISTANT COATED WIRE

(75) Inventor: James J. Xu, Fort Wayne, IN (US)

(73) Assignee: Phelps Dodge Industries, Inc., Fort Wayne, IN (US)

( * ) Notice: Subject to any disclaimer, the term of this patent is extended or adjusted under 35 U.S.C. 154(b) by 0 days.

(21) Appl. No.: 09/436,272

(22) Filed: Nov. 8, 1999

Related U.S. Application Data

(60) Provisional application No. 60/142,842, filed on Jul. 8, 1999, now abandoned.

(51) Int. Cl.[7] .............................. B32B 15/00; H01B 7/00

(52) U.S. Cl. .......................... 428/379; 428/372; 428/383; 428/389; 174/110 SR; 174/102 P; 174/110 FC; 174/110 PM; 174/110 N

(58) Field of Search .................................... 428/372, 379, 428/383, 389; 174/110 SR, 110 N, 110 PM, 110 FC, 120 SR, 102 P

(56) References Cited

U.S. PATENT DOCUMENTS

| | | |
|---|---|---|
| 3,615,913 | 10/1971 | Shaw . |
| 4,340,697 | 7/1982 | Aya et al. . |
| 4,342,814 | 8/1982 | Usuki et al. . |
| 4,350,738 | 9/1982 | Saunders et al. . |
| 4,377,652 | 3/1983 | Ohmura et al. . |
| 4,405,687 | 9/1983 | Morita et al. . |
| 4,426,423 | 1/1984 | Intrater et al. . |
| 4,476,192 | 10/1984 | Imai et al. . |
| 4,503,124 | 3/1985 | Keane et al. . |
| 4,563,369 | 1/1986 | Lavallee . |
| 4,693,936 | 9/1987 | McGregor et al. . |
| 4,716,079 | 12/1987 | Sano et al. . |
| 4,935,302 | 6/1990 | Hjortsberg et al. . |
| 5,066,513 | 11/1991 | Zurecki et al. . |
| 5,209,987 | 5/1993 | Penneck et al. . |
| 5,296,260 | 3/1994 | Sawada et al. . |
| 5,350,638 | 9/1994 | Sawada et al. . |
| 5,393,612 | 2/1995 | Matsuura et al. . |
| 5,425,992 | 6/1995 | Tachikawa et al. . |
| 5,443,905 | 8/1995 | Sawada et al. . |
| 5,861,578 | 1/1999 | Hake et al. . |
| 5,902,681 * | 5/1999 | Ueoka et al. ........................ 428/383 |

FOREIGN PATENT DOCUMENTS

| | | |
|---|---|---|
| 54-99137 * | 4/1979 | (JP) . |
| 63-81173 | 4/1988 | (JP) . |
| 3-245417 | 11/1991 | (JP) . |
| 5-320340 | 12/1993 | (JP) . |
| 09294652 | 10/1997 | (JP) . |
| WO 86/03329 | 6/1986 | (WO) . |

OTHER PUBLICATIONS

Brochure—Poly–Thermaleze®TW (PTZ TW), Phelps Dodge Magnet Wire Company 1998.

Article—*Improved Tough Wire*, James J. Xu, Phelps Dodge Magnet Wire Company, undated.

Article—*Dynamic Mechanical Properties of Tough Magnet Wire*, James J. Xu et al., Phelps Dodge Magnet Wire Company, Oct. 1998.

Article—*Synthesis and characterization of a rubber incorporated polyamideimide*, Debasish Sen et al, Makromol. Chem, 186, 1625–1630 (1985).

* cited by examiner

*Primary Examiner*—Cynthia H. Kelly
*Assistant Examiner*—J. M. Gray
(74) *Attorney, Agent, or Firm*—Barnes & Thornburg

(57) ABSTRACT

A coated wire that includes an electrical conductor having an abrasion and varnish craze resistant lubricated coating. The coating is made of a ceramic particulate material dispersed in a polyamideimide binder. Ceramic particulate materials suitable for incorporation in the coatings include silicon nitride ($Si_3N_4$), aluminum nitride (AlN), and titanium nitride (TiN).

17 Claims, 2 Drawing Sheets

ABRASION RESISTANT COATED WIRE

RELATED APPLICATIONS

The present application is based upon U.S. Provisional Application Ser. No. 60/142,842, filed on Jul. 8, 1999, abandoned, the complete disclosure of which is hereby expressly incorporated by reference.

TECHNICAL FIELD

This invention relates to an electrical conductor having an insulation coating. More particularly, the present invention relates to an electrical conductor having an abrasion and varnish craze resistant lubricated coat system.

BACKGROUND ART

Coated electrical conductors may comprise one or more electrical insulation layers formed around a conductive core. Magnet wire is one form of coated electrical conductor in which the conductive core is a copper wire, and the insulation layer or layers comprise dielectric materials, such as polymeric resins. Magnet wire is used in the electromagnet windings of transformers, electric motors, and the like. Because of its use in such windings, friction, and abrading forces are often encountered. As a result, this insulation layer can be susceptible to damage.

High voltage-surge failure rate, for example, has been of concern to motor manufacturers. Surge failure is associated with insulation damage resulting from modern, fast automatic winding and abusive coil insertion processes for motor stators. Coating a polyester insulated wire with an abrasion resistant polyamideimide and wax is one way to minimize friction thereby reducing wire surface damage during the winding process. Wires manufactured in this manner, however, can experience surge failure rates of at least about 10,0000–20,0000 parts per million. Another form of failure is varnish craze. Varnish craze is a small fissure (about 1–2 microns deep) on the surface of the coating. Typically, varnish craze includes several fissures in a localized area that impair the insulative properties of the wire. Therefore, a need exists for a wire coating that will offer high resistance to the various damaging effects to wire coatings, including abrasion, and varnish craze.

SUMMARY OF THE INVENTION

According to certain features, characteristics, embodiments and alternatives of the present invention which will become apparent as the description thereof proceeds below, the present invention provides an electrical conductor having an abrasion and varnish craze resistant lubricated coat system. The coating is made of a ceramic particulate material dispersed in a polyamideimide binder. Ceramic particulate materials suitable for incorporation in the coatings include silicon nitride ($Si_3N_4$) , aluminum nitride (AlN) , and titanium nitride (TiN). The particulate size for these ceramic materials generally ranges from 1 to 10 microns. The amount of ceramic particulate material that is used is generally from 1 to 15 percent by weight.

In another embodiment, the coating includes a ceramic particulate material and a fluoroplastic dispersed in a polyamideimide. The ceramic particulate materials being used are the same as those listed above. The fluoroplastics that may be used include polytetrafluoroethylene, polychlorotrifluoroethylene, polyvinylidene fluoride, and fluorinated ethylene propylene.

In still another embodiment, the coating includes a ceramic particulate material with polyethylene dispersed in polyamideimide. The ceramic particulate materials that can be used are, again, the same as those listed above.

In a further embodiment, a base insulation coat may be applied to a conductor. The base insulation coat may be made from any of a variety of heat resistant, electrical insulation materials such as polyetherimide, polyimide, polyesterimide, epoxy resin, polyester used as basecoat and bondable coat, polyarylsufone, and polyether ether ketone. All of the above embodiments may be used as an enamel topcoat over the insulation coat.

BRIEF DESCRIPTION OF DRAWINGS

The present invention will be described hereafter with reference to the attached figures which are given as non-limiting examples only, in which.

Corresponding reference characters indicate corresponding parts throughout the several figures. The exemplification set out herein.

DETAILED DESCRIPTION OF THE DRAWINGS

Figure 1:
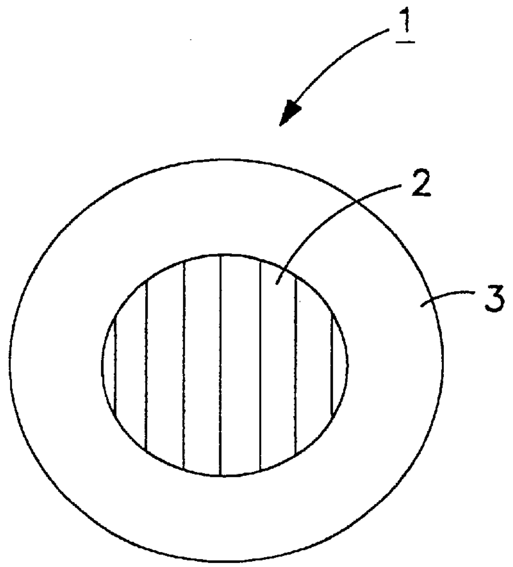
FIG. 1 is a cross sectional view of an abrasion resistant coated wire according to one embodiment of the present invention.
Figure 2:
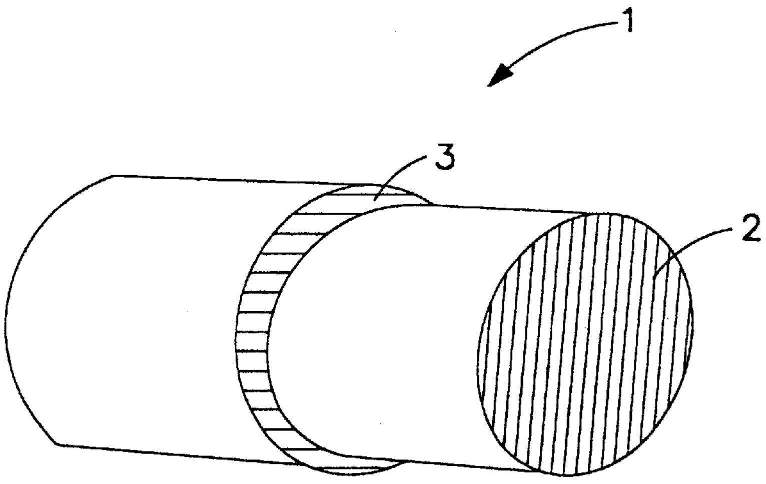
FIG. 2 is a perspective view of the wire of FIG. 1.

This invention relates to an electrical conductor having an insulation coating. More particularly, the present invention relates to an electrical conductor having an abrasion and varnish craze resistant lubricated coat system. The abrasion resistant coated magnet wire 1 according to one embodiment of the present invention is shown in FIGS. 1 and 2. Magnet wire 1 comprises a coating 3 formed around a conductive core 2. Conductive core 2 is illustratively a copper wire. It is appreciated, however, that core 2 may be formed from any suitable ductile conductive material. For example, core 2 may be formed from copper clad aluminum, silver plated copper, nickel plated copper, aluminum alloy 1350, combinations of these materials, or the like.

Coating 3 may be formed from a ceramic, generally global-shaped particulate material, dispersed in a polyamideimide binder having electrically insulative, flexible properties. Because of its electrically insulative properties, coating 3 helps insulate conductive core 2 as it carries electrical current during motor operations. Because of its flexibility characteristics, coating 3 is resistant to cracking and/or delaminating, as well as being impact and scrape resistant. This substantially improves the wire's toughness so that when it is wound into the windings of an electric motor it will not be damaged.

Coating 3 may be applied peripherally about conductive core 2 by a variety of means. For example, coating 3 may be formed from a prefabricated film that is wound around the conductor. Coating 3 may also be applied using extrusion coating techniques. Alternatively, coating 3 may be formed from one or more fluid thermoplastic or thermosetting polymeric resins and applied to conductor 2, and dried and/or cured using one or more suitable curing and/or drying techniques such as chemical, radiation, or thermal treatments. A variety of such-polymeric resins known to those skilled in the art may be used, including terephthalic acid alkyds, polyesters, polyesterimides, polyesteramides, polyesteramideimides, polyesterurethanes, polyurethanes, epoxy resins, polyamide, polyimides, polyamideimides, polysulphones, silicone resins, polymers incorporating polyhydantion, phenolic resins, vinyl copolymers, polyolefins, polycarbonates, polyethers, polyetherimides, polyetheramides, polyetheramideimides, polyisocyanates, combinations of these materials, and the like.

Ceramic particulates such as silicon nitride, aluminum nitride and titanium nitride can increase the toughness of wire 1. The amount of ceramic particulates added to coating 3 should be about 1%–15% by weight of the coat with about 3%–6% by weight of the coat preferable. This is because between 3%–6%, the ceramic provides substantial protection yet the wire is still flexible enough to wind properly. If more than 15% by weight ceramic particulate material is added the conductor becomes less flexible, thereby reducing its ability to serve as a magnet wire. In addition, the ceramic material's particle size can be about 1 to 10 microns, preferably 3 to 5 microns. In one embodiment, coating 3 comprises a ceramic particulate material in combination with a fluoropolymer dispersed in a polyamideimide binder. Fluoropolymers that may be used include polytetrafluoroethylene, polychlorotrifluoroethylene, polyvinylidene fluoride and fluorinated ethylene propylene. About 1% of fluoropolymer by weight of coating may be used. In addition, the fluoropolymer may have a particle size ranging from 0.5 to 10 microns. The preferred particle size is 1 to 3 microns creating improved enamel solution stability as well as improved penetration of the particles within the thin film.

In another embodiment, coating 3 comprises a ceramic particulate material in combination with a polyethylene dispersed in a polyamideimide binder. About 1% of polyethylene by weight of coating is used. In addition, the polyethylene may have a particle size ranging from 5 to 15 microns. The preferred particle size may be less than 10 microns for the same reasons previously discussed.

Figure 3:
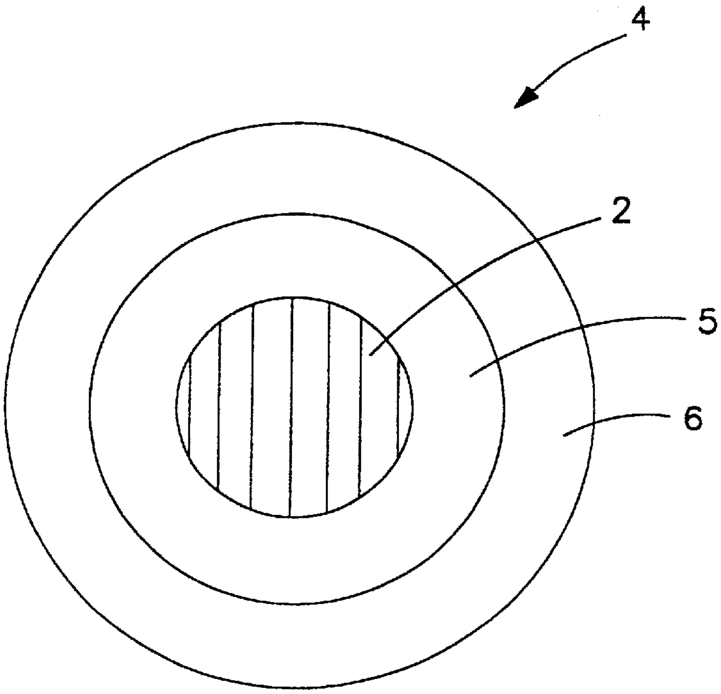
FIG. 3 is a cross sectional view of another embodiment of an abrasion resistant coated wire.
Figure 4:
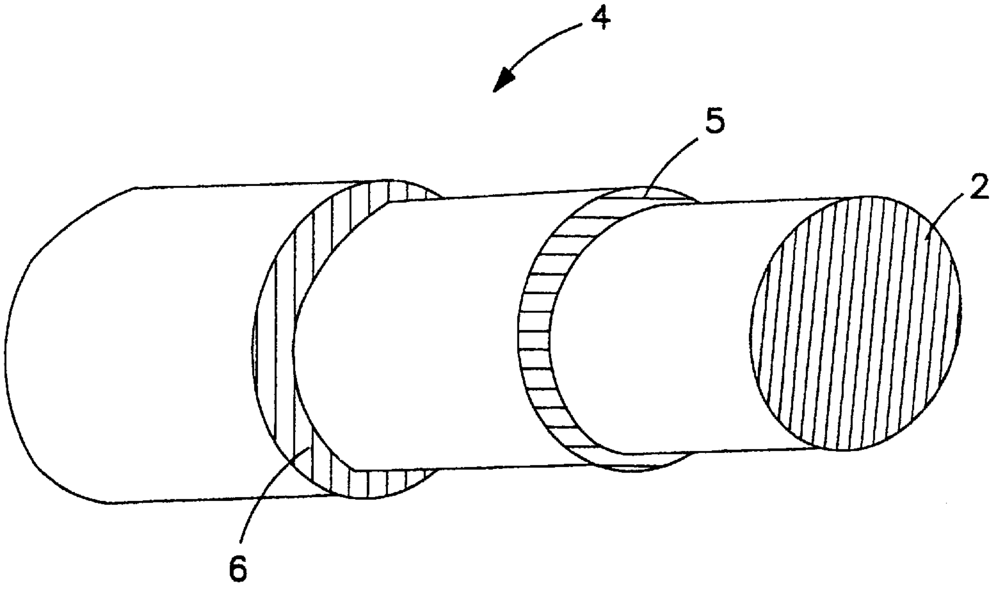
FIG. 4 is a perspective view of the wire of FIG. 3.

In a still further embodiment, the present invention comprises a dual-layer conductive wire 4 as shown in FIGS. 3 and 4. A topcoat 6 provides additional operational stability for insulation layer 5. Insulation layer 5 is applied peripherally about the electrical conductor 2. Insulation layer 5 may be formed from any insulative material known to those skilled in the art suitable for forming electrically insulative, flexible base coatings for electrical conductors. For example, polyetherimide, polyimide, polyesterimide, epoxy resin, polyester used as basecoat and bondable coat, polyarylsufone, and polyether ether ketone may be used.

Ceramic-polyamideimide topcoat 6 is then applied peripherally about insulation coat 5. The several embodiments of the ceramic-polyamideimide coating previously discussed may serve as topcoat 6. In addition, ceramic-polyamideimide topcoat 6 comprising either a fluoropolymer or polyethylene as previously discussed may also be used.

The present invention will now be described with respect to the following examples which are intended to be only representative of the manner in which the principles of the present invention may be implemented in actual embodiments. The following examples are not intended to be an exhaustive representation of the present invention. Nor are the following examples intended to limit the present invention only to the precise forms which are exemplified.

WORKING EXAMPLES AND COMPARISON TESTS

The following working examples were based on three 18 gauge control wires having different enamel compositions applied to each wire. For example, control wire I comprised a polyamideimide enamel; control wire II comprised a polyamideimide enamel with polytetrafluoroethylene; and control wire III comprised a polyamideimide enamel with polyethylene. Ceramic nitride particulates were added in varying percentages (by weight) to the enamel composition of each control wire. These test wires were tested via the repeated scrape test and subjected to a coefficient of friction analysis and compared to their respective control wire.

The repeated scrape test is a widely recognized and employed measure of abrasion resistance for wire coatings. The repeated scrape test consists of a test wire suspended adjacent a pendulum having a needle attached at the end thereof. The needle swings back and forth scraping the coating on the periphery of the wire. A defined loading is applied to the pendulum providing a controlled force to the needle against the wire. For the working examples described herein, the control and test wires were tested under a 700-gram load pendulum scraper for an 18 gauge (1 mm diameter) copper wire. The number of strokes (Rptd. S.) it took the scraper to wear through the coatings was recorded. A greater number of strokes before failure indicated a more abrasion resistant coating.

In addition, a dynamic coefficient of friction test was performed on the wires. This test included subjecting the wires under a load of 1000 grams, an 18 AWG wire pulled at a constant speed. The dynamic coefficient of friction (C. of F.) was recorded over approximately 1000 sampling points. A low coefficient of friction indicated a self-lubricating property in the magnet wire enamel reducing the wear on the wire.

The following is the procedure for making control wires I, II and III.

Control Wire I 1 mole of Diphenylmethane 4,4'-diisocyanate (MDI), 0.7–1.0 mole of Trimellic Anhydride (TMA), 0–0.5 mole of Adipic Acid (AA), and 0–0.5 mole of Isophthalic Acid (IPA) were added into mixed solvents of N-Methyl pyrrolidone (NMP) and aromatic solvent NJ100. The reaction was carried out at 70° C.–90° C. for at least three hours and then at 120° C.–150° C. until all the diisocyanate groups disappeared as indicated by a Fourier Transform Infrared spectrometer (FTIR). A small amount of additives such as versar wax, aliphatic diisocyanate, and fluorocarbon-based surfactant may be present. The reaction was then stopped with mixed solvents of alcohol, NMP and NJ100. The solids content was controlled within 26%–30%, and the resultant enamel had a viscosity of 1700–2400 cps at 37.8° C.

The resultant enamel was applied to an 18 AWG copper wire which was precoated with eight passes of polyester basecoat at the speed of 28–60 meters per minute in an oven having temperatures of 450° C.–600° C. The insulation build is approximately 3.0–3.3 mil.

Control Wire II

The wire made for control II was made identical to that made for control I but for the addition of 3% (solids/solids) polytetrafluoroethylene powder into the polyamideimide enamel. The typical size of the polytetrafluoroethylene powder was in the range of 1–3 microns. The melting point of polytetrafluoroethylene powder used in this control was approximately 320° C.–340° C.

Control Wire III

The wire made for control III was made identical to that made for control I as well, but for the addition of 3% (solids/solids) polyethylene powder into the polyamideimide enamel. The typical size of polyethylene powder was in the range of 1–10 microns. The melting point of polyethylene powder used in this control was approximately 100° C.

Silicon Nitride ($Si_3N_4$) Working Examples

Varying amounts of $Si_3N_4$ including 1%, 2%, 3%, 4%, 6%. 9%, 12% and 15% by weight were added to each control wire. Each control wire with $Si_3N_4$ was then tested and compared to each control wire with no $Si_3N_4$ to determine effects on abrasion resistance. The following illustratively describes how the varying amounts of $Si_3N_4$ were added to the enamel of each wire.

One percent of $Si_3N_4$ ceramic powder having a particle size ranging from submicron to 10 microns was added to the enamel solution of each wire (control I, control II and control III). Silicon nitride ceramic was added before the reaction of polyamideimide at the temperatures of 30° C.–90° C. The enamel was mixed with a fast-sharring device for approximately 8 hours. The resultant enamel was then passed through a filter to remove any gel particulates. The solids and viscosity of the enamel were 28%–30%, and 2000–2500 cps at 37.8° C.

The resultant enamel for each control was applied to the 18 AWG copper wires, each precoated with eight passes of polyester basecoat at the speed of 28–65 m/m in an oven having a temperature profile of 450° C.–600° C. Results were achieved with cure speeds of 28–60 m/m in an 500° C. MAG oven; and 50–60 m/m in an 600° C. MAG oven. The wall-to-wall build or thickness of the coated wire was controlled to be within 3.5 mils, and preferably within 3.0–3.3 mils. The build ratio of topcoat to basecoat was controlled to be within 15%–25% to 75%–85%. It was preferable to make 3–4 passes of the said topcoat, since a topcoat made from only 2 passes may suffer blistering or produce microbubbles. It has been found that an enamel coating built from greater than two passes is relatively insensitive to the curing conditions such as curing speed and oven temperature.

Two percent $Si_3N_4$ ceramic powder having a particle size ranging from submicron to 10 microns was added to the enamel solution of each wire, control I, control II and control III. Silicon nitride ceramic was added before the reaction of polyamideimide at the temperatures of 30° C.–90° C. The enamel was mixed with a fast-sharring device for approximately 8 hours. The resultant enamel was then passed through a filter to remove any gel particulates. The solids and viscosity of the enamel were 28%–30%, and 2000–2500 cps at 37.8° C.

The resultant enamel for each control was also applied to the 18 AWG copper wires, each precoated with eight passes of polyester basecoat at the speed of 28–60 m/m in an oven having a temperature profile of 450° C.–600° C. The wall-to-wall build of each coated wire was controlled within 3.5 mils and preferably 3.0–3.3 mils. The build ratio of topcoat to basecoat was controlled within 15%–25% to 75%–85%.

Three percent $Si_3N_4$ ceramic powder having a particle size ranging from submicron to 10 microns was added to the enamel solution of each wire, control I, control II and control III. Silicon nitride ceramic was added before the reaction of polyamideimide at the temperatures of 30° C.–90° C. Like the prior examples, the enamel was mixed with a fast-sharring device for approximately 8 hours. The resultant enamel was then passed through a filter to remove any gel particulates. The solids and viscosity of the enamel were 28%–30%, and 2000–2500 cps at 37.8° C.

The resultant enamel for each control was applied to the 18 AWG copper wires, each precoated with eight passes of polyester basecoat at the speed of 28–60 m/m in an oven having temperature profile of 450° C.–600° C. The wall-to-wall build of each coated wire was controlled within 3.5 mils, and preferably within 3.0–3.3 mils. The build ratio of topcoat to basecoat was controlled within 15%–25% to 75%–85%.

Four percent $Si_3N_4$ ceramic powder whose particle size ranges from submicron to 10 microns was added to the enamel solution of each wire, control I, control II and control III. Silicon nitride ceramic may be added before the reaction of polyamideimide at temperatures of 30° C.–90° C. The enamel was mixed with a fast-sharring device for approximately 8 hours. The resultant enamel was then passed through a filter to remove any gel particulates. The solids and viscosity of the enamel were 28%–30%, and 2000–2500 cps at 37.8° C., respectively.

The resultant enamel for each control was applied to the 18 AWG copper wires, each precoated with eight passes of polyester basecoat at the speed of 28–60 m/m in an oven having temperature profile of 450° C.–600° C. The wall-to-wall build of each coated wire was controlled within 3.5 mils, and preferably within 3.0–3.3 mils. The build ratio of topcoat to basecoat was controlled within 15%–25% to 75%–85%.

Six percent $Si_3N_4$ ceramic powder whose particle size ranges from submicron to 10 microns was added to the enamel solution of each wire, control I, control II and control III. Silicon nitride ceramic may be added before the reaction of polyamideimide at the temperatures of 30° C.–90° C. The enamel was mixed with a fast-sharring device for approximately 8 hours. The resultant enamel was then passed through a filter to remove any gel particles. The solids and viscosity of the enamel were 28%–30%, and 2000–2500 cps at 37.8° C.

The resultant enamel for each control was applied to the 18 AWG copper wires, each precoated with eight passes of polyester basecoat at the speed of 28–60 m/m in an oven having temperature profile of 450° C.–600° C. The wall-to-wall build of each coated wire was controlled within 3.5 mils, and preferably within 3.0–3.3 mils. The build ratio of topcoat to basecoat was controlled within 15%–25% to 75%–85%. In an alternative embodiment, the resultant enamel was coated as a single build without the basecoat. In this embodiment the wall-to-wall build was controlled within 2.5 mils, preferably 2.0–2.3 mils.

All of these wires were prepared in an identical manner. For these wires, 9%, 12%, or 15% of $Si_3N_4$ ceramic powder whose particle size ranges from submicron to 10 microns was added to the enamel solution of each wire, control I, control II and control III. Silicon nitride ceramic was added before the reaction of polyamideimide at the temperatures of 30° C.–90° C. The enamel was mixed with a fast-sharring device for approximately 8 hours. The resultant enamel was then passed through a filter to remove any gel particles. The solids and viscosity of the enamel were 28%–30%, and 2000–2500 cps at 37.8° C.

The resultant enamel for each control was applied to the 18 AWG copper wires, each precoated with eight passes of polyester basecoat at the speed of 28–60 m/m in an oven having temperature profile of 450° C.–600° C. The wall-to-wall build of each coated wire was controlled within 3.5 mils, and preferably within 3.0–3.3 mils. The build ratio of topcoat to basecoat was controlled within 15%–25% to 75%–85%.

Control wires I, II and III as well as the test wires of each percentage of $Si_3N_4$ were subjected to the repeated scrape and the coefficient of friction tests. Their results are shown in the table below. For all three controls the number of repeated scrapes increased dramatically as silicon nitride was added. This indicates that silicon nitride increases the abrasion resistance of the coating. This occured even where a minor increase in the coefficient of friction was seen. Specifically, control I shows the Rptd. S. rose from 80 with no silicon nitride to 1010 with 6% silicon nitride by weight, and up to 1690 with a 12% increase. These increases occurred despite the fact that the C. of F. of the wire with 12% silicon nitride rose to 0.31. Adding 4% by weight silicon nitride to control II increased the Rptd. S. from 270 to 350. A 12% increase in silicon nitride increased the Rptd.S. to 1654 with C. Of F. of 0.15. Adding 3% silicon nitride to control III increased the Rptd. S. from 275 to 530 and increased to 1265 with 12% silicon nitride having a C. Of F. of 0.26. Although the data are scattered to some extent, the general trend clearly indicates a substantial increase in wire abrasion resistance as more silicon nitride is added to the wire coating.

Like the silicon nitride examples, controls I, II and III with varying amounts of AlN were subjected to the repeated scrape and the coefficient of friction. Their results are shown in the table below. For all three controls the number of repeated scrapes increased dramatically as aluminum nitride was added, indicating an increase in abrasion resistance, although a minor increase in the coefficient of friction was seen. Specifically, control I shows the repeated scrape rose from 474 to 1709 with 12% AlN. AlN added to control II shows an even more dramatic increase in repeated scrape. Adding just 3% AlN increases the repeated scrape from 270 to 780. Though there exists some fluctuation in the rate of repeated scrape increase, the trend still indicates a substantial increase in abrasion resistence. Control III shows a repeated scrape increase from 1120 with 6% AlN to 3900 with 12% AlN.

$Si_3N_4$ Coated Wire
Abrasion Resistance Comparison

| | Amount $Si_3N_4$ | 0% (Cntl) | 1% | 2% | 3% | 4% | 6% | 9% | 12% | 15% |
|---|---|---|---|---|---|---|---|---|---|---|
| Cntl | Build | 3.2 | — | — | 3.4 | — | 3.4 | — | 3.4 | — |
| I | Rptd.S. | 80 | — | — | 255 | — | 1010 | — | 1690 | — |
| | C. of F. | 0.28 | — | — | 0.24 | — | 0.28 | — | 0.31 | — |
| Cntl | Build | 3.2 | 3.2 | 3.2 | 3.2 | 3.2 | 3.2 | 3.2 | 3.2 | 3.2 |
| II | Rptd.S. | 270 | 290 | 340 | 280 | 350 | 350 | 513 | 1654 | 1459 |
| | C. of F. | 0.13 | 0.14 | 0.13 | 0.13 | 0.13 | 0.13 | — | 0.15 | — |
| Cntl | Build | 3.2 | — | — | 3.2 | — | 3.2 | — | 3.2 | — |
| III | Rptd.S. | 275 | — | — | 430 | — | 530 | — | 1265 | — |
| | C. of F | 0.20 | — | — | 0.22 | — | 0.24 | — | 0.26 | — |

Aluminum Nitride (AlN) Working Examples

In this example, varying amounts of AlN were added to each control wire. Each control wire with AlN was then tested and compared to each control wire with no AlN to determine the effects on abrasion resistance. The following illustratively describes how the varying amounts of AlN were added to the enamel of each wire.

First, 3% of AlN ceramic powder whose particle size ranges from submicron to 10 microns was added to the enamel solution of each wire, control I, control II and control III. The AlN was added after the reaction at a temperature below 120° C. because moisture in the pores degrades the formation of the polyamideimide.

The enamel was mixed with a fast-sharring device for approximately 8 hours. The resultant enamel was then passed through a filter to remove any gel particulates. The solids and viscosity of the enamel were 28%–30%, and 2000–2500 cps at 37.8° C., respectively.

The resultant enamel for each control was applied to the 18 AWG copper wires, each precoated with eight passes of polyester basecoat at the speed of 28–65 m/m in an oven having a temperature profile of 450° C.–600° C. Results were achieved with cure speeds of 28–36 m/m in an 500° C. MAG oven; and 50–60 m/m in an 600° C. MAG oven. The wall-to-wall build or thickness of the coated wire was controlled within 3.5 mils, and preferably within 3.0–3.3 mils. The build ratio of topcoat to basecoat was controlled within 15%–25% to 75%–85%. It has been demonstrated that wire coatability of this enamel is relatively insensitive to the curing condition such as curing speeds and oven temperatures. It may be preferable, however, to make 3–4 passes of the said topcoat, since the topcoat made from only 2 passes may blister or produce microbubbles. The same procedure as described above was applied to control wire I adding 6%, 9%, 12% and 15% AlN. In addition, the same procedure was applied to control wires II and III adding 3%, 6%, 9%, 12% and 15% AlN.

AlN Coated Wire
Abrasion Resistance Comparison

| | Amount AlN | 0% (Cntl) | 3% | 6% | 9% | 12% | 15% |
|---|---|---|---|---|---|---|---|
| Cntl. I | Build | 3.2 | 3.3 | 3.3 | 3.3 | 3.3 | 3.4 |
| | Rptd.S. | 80 | 474 | 273 | 485 | 1709 | 1690 |
| | C. of F. | 0.30 | 0.24 | 0.24 | 0.25 | 0.29 | 0.30 |
| Cntl. II | Build | 3.2 | 3.3 | 3.3 | 3.3 | 3.3 | 3.3 |
| | Rptd.S. | 270 | 780 | 995 | 1515 | 1150 | 1625 |
| | C. of F. | 0.14 | 0.16 | 0.14 | 0.17 | 0.14 | 0.14 |
| Cntl. III | Build | 3.2 | 3.3 | 3.3 | — | 3.3 | — |
| | Rptd.S. | 275 | 270 | 1120 | — | 3900 | — |
| | C. of F | 0.20 | 0.23 | 0.23 | — | 0.24 | — |

Titanium Nitride (TiN) Working Examples

In this example, varying amounts of TiN were added to each control wire. Each control wire with TiN was then tested and compared to each control wire with no TiN to determine the increase in abrasion resistance. The following describes how the varying amounts of TiN were added to the enamel of each wire.

First, 1% of TiN ceramic powder whose particle size ranges from submicron to 10 microns was added to the enamel solution of each wire, control I, control II and control III. The TiN was added after the reaction at a temperature below 120° C. because moisture in the pours degrades the formation of the polyamideimide.

The enamel was mixed with a fast-sharring device for approximately 8 hours. The resultant enamel was then passed through a filter to remove any gel particles. The solids and viscosity of the enamel were 28%–30%, and 2000–2500 cps at 37.8° C.

The resultant enamel for each control was applied to the 18 AWG copper wires, each precoated with eight passes of polyester basecoat at the speed of 28–60 m/m in an oven having a temperature profile of 450° C.–600° C. Results were achieved with cure speeds of 28–36 m/m in an 500° C. MAG oven; and 50–60 m/m in an 600° C. MAG oven. The wall-to-wall build or thickness of the coated wire was controlled within 3.5 mils, and preferably within 3.0–3.3 mils. The build ratio of topcoat to basecoat was controlled within 15%–25% to 75%–85%. Generally, wire coatability of this enamel is relatively insensitive to curing such as curing speeds and oven temperatures. It may be preferable, however, to make 3–4 passes of the said topcoat, since the topcoat from only 2 passes may result in blistering or produce microbubbles. The same procedure as described above was applied to control wire I adding 2%, 3%, 4% and 6% TiN. In addition, the same procedure was applied to control wires II and II adding 1%, 2%, 3%, 4%, and 6% TiN.

Like the silicon nitride and aluminum nitride examples, controls I, II and III with varying amounts of TiN were subjected to the repeated scrape and the coefficient of friction. Their results are shown in the table below. For all three controls the number of repeated scrapes increased as TiN was added, indicating an increase in abrasion resistance. Specifically, though control I showed only some increase in repeated scrape, control II showed a dramatic increase in repeated scrape from 270 with 0% TiN to 1520 with 6% TiN. Control III shows a similar increase in abrasion resistance.

AlN Coated Wire
Abrasion Resistance Comparison

| | Amount AlN | 0% (Cntl) | 1% | 2% | 3% | 4% | 6% |
|---|---|---|---|---|---|---|---|
| Cntl. I | Build | 3.2 | 3.2 | 3.2 | 3.2 | 3.2 | 3.2 |
| | Rptd.S. | 80 | 59 | 100 | 92 | 92 | 80 |
| | C. of F. | 0.30 | 0.32 | 0.32 | 0.32 | 0.32 | 0.32 |
| Cntl. II | Build | 3.2 | 3.2 | 3.2 | 3.2 | 3.2 | 3.2 |
| | Rptd.S. | 270 | 330 | 400 | 740 | 800 | 1520 |
| | C. of F. | 0.14 | 0.14 | 0.14 | 0.14 | 0.14 | 0.14 |
| Cntl. III | Build | 3.2 | 3.2 | 3.2 | 3.2 | 3.2 | 3.2 |
| | Rptd.S. | 275 | 248 | 312 | 325 | 520 | 644 |
| | C. of F | 0.20 | 0.22 | 0.22 | 0.23 | 0.23 | 0.23 |

I claim:

1. An abrasion resistant coated wire comprising:

an electrical conductor; and a coating disposed peripherally about the electrical conductor; said coating comprising a ceramic particulate material dispersed in a polyamideimide binder;

wherein the ceramic particulate material has a particle size of about 1 to 10 microns and the ceramic particulate material is present in an amount of about 1%–15% by weight of the coat.

2. The abrasion resistant coated wire of claim 1, wherein the ceramic particulate material is made from a material selected from a group consisting of silicon nitride, aluminum nitride, titanium nitride, boron nitride, molybdenum disulfide, and combinations thereof.

3. An abrasion resistant coated wire comprising:

an electrical conductor having a coating disposed peripherally about the electrical conductor; and said coating comprising a ceramic particulate material and a fluoropolymer material dispersed in a polyamideimide binder;

wherein the ceramic particulate material has a particle size of about 1 to 10 microns and the ceramic particulate material is present in an amount of about 1%–15% by weight of the coat; and wherein the fluoropolymer material is present in an amount of about 1% by weight of the coat and the fluoropolymer material has a particle size of about 0.5 to 10 microns.

4. The abrasion resistant coated wire of claim 3, wherein the ceramic particulate material is made from a material selected from a group consisting of silicon nitride, aluminum nitride, titanium nitride, boron nitride, molybdenum disulfide, and combinations thereof.

5. The abrasion resistant coated wire of claim 3, wherein the fluoropolymer is made from a material selected from a group consisting of polytetrafluoroethylene, polychlorotrifluoroethylene, polyvinylidene fluoride, fluorinated ethylene propylene, and combinations thereof.

6. An abrasion resistant coated wire comprising:

an electrical conductor; and a coating disposed peripherally about the electrical conductor, said coating comprising a ceramic particulate material and a polyethylene material dispersed in a polyamideimide binder;

wherein the ceramic particulate material is present in an amount of about 1%–15% by weight of the coat and has a particle size of about 1 to 10 microns; and wherein the polyethylene material has a particle size of about 5 to 15 microns and is present in an amount of about 1% by weight of the coat.

7. The abrasion resistant coated wire of claim 6, wherein the ceramic particulate material is made from a material selected from a group consisting of silicon nitride, aluminum nitride, titanium nitride, boron nitride, molybdenum disulfide, and combinations thereof.

8. An abrasion resistant coated wire comprising:

an electrical conductor;

a base insulation coat disposed peripherally about the electrical conductor; and a top abrasion resistant coat comprising a ceramic particulate material dispersed in a polyamideimide binder;

wherein the ceramic particulate material is present in an amount of about 1%–15% by weight of the coat; and wherein the ceramic particulate material has a particle size of about 1 to 10 microns.

9. The abrasion resistant coated wire of claim 8, wherein the base insulation coat is made from a material selected from a group consisting of polyester, polyesterimide, polyimide, epoxy resin, polyarylsufone, polyether ether ketone and combinations thereof.

10. The abrasion resistant coated wire claim 8, wherein the ceramic particulate material is made from a material selected from a group consisting of silicon nitride, aluminum nitride, titanium nitride, boron nitride, molybdenum disulfide, and combinations thereof.

11. An abrasion resistant coated wire comprising:

an electrical conductor;

a base insulation coat disposed peripherally about the electrical conductor; and a top abrasion resistant coat comprising a ceramic particulate material and a fluoropolymer material dispersed in a polyamideimide binder;

wherein the ceramic particulate material is present in an amount of about 1%–15% by weight of the coat and has a particle size of about 1 to 10 microns; and wherein the fluoropolymer material is present in an amount of about 1% by weight of the coat and has a particle size of about 0.5 to 10 microns.

12. The abrasion resistant coated wire of claim 11, wherein the base insulation coat is made from a material selected from a group consisting of polyester, polyesterimide, polyimide, epoxy resin, polyarylsufone, polyether ether ketone and combinations thereof.

13. The abrasion resistant coated wire of claim 11, wherein the ceramic particulate material is made from a material selected from a group consisting of silicon nitride, aluminum nitride, titanium nitride, boron nitride, molybdenum disulfide, and combinations thereof.

14. The abrasion resistant coated wire of claim 11, wherein the fluoropolymer is made from a material selected from a group consisting of polytetrafluoroethylene, polychlorotrifluoroethylene, polyvinylidene fluoride, fluorinated ethylene propylene, and combinations thereof.

15. An abrasion resistant coated wire comprising:

an electrical conductor;

a base insulation coat disposed peripherally about the electrical conductor; and a top abrasion resistant coat comprising a ceramic particulate material and a polyethylene material dispersed in a polyamideimide binder;

wherein the ceramic particulate material having an amount of particulates from about 1%–15% by weight of the coat and has a particle size of about 1 to 10 microns; and wherein the polyethylene material has a particle size of about 5 to 15 microns and is present in an amount of about 1% by weight of the coat.

16. The abrasion resistant coated wire of claim 15, wherein the base insulation coat is made from a material selected from a group consisting of polyester, polyesterimide, polyimide, epoxy resin, polyarylsufone, polyether ether ketone and combinations thereof.

17. The abrasion resistant coated wire of claim 15, wherein the ceramic particulate material is made from a material selected from a group consisting of silicon nitride, aluminum nitride, titanium nitride, boron nitride, molybdenum disulfide, and combinations thereof.

* * * * *